US007562560B1

(12) United States Patent
Perry

(10) Patent No.: US 7,562,560 B1
(45) Date of Patent: Jul. 21, 2009

(54) ENGINE OFF VACUUM DECAY METHOD FOR INCREASING PASS/FAIL THRESHOLD USING NVLD

(75) Inventor: Paul D. Perry, Chatham (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 0 days.

(21) Appl. No.: 11/517,905

(22) Filed: Sep. 8, 2006

Related U.S. Application Data

(60) Provisional application No. 60/715,726, filed on Sep. 9, 2005.

(51) Int. Cl.
*G01M 3/04* (2006.01)

(52) U.S. Cl. .......................... 73/49.7

(58) Field of Classification Search .................. 73/49.7, 73/37, 40, 46
See application file for complete search history.

(56) References Cited

U.S. PATENT DOCUMENTS 5,890,474 A * 4/1999 Schnaibel et al. ........... 123/520
6,820,466 B2 * 11/2004 Streib ......................... 73/49.2
7,004,014 B2 2/2006 Perry
2003/0136182 A1 * 7/2003 Streib ......................... 73/49.2
2004/0134472 A1 * 7/2004 Duty et al. .................. 123/698

* cited by examiner

*Primary Examiner*—Hezron Williams
*Assistant Examiner*—Gunnar J Gissel

(57) ABSTRACT

A technique is provided for detecting leaks in a fuel system such as an automotive fuel system. The technique complements an on-board diagnostics evaporative leak monitor that uses natural vacuum leak detection (NVLD). The technique utilizes the same switch and valve utilized by NVLD.

Before engine shut-down, the system maintains a vacuum in the fuel tank and also provides a low-level purge flow. Upon engine shut-down, a timer is started and the NVLD switch is monitored to determine how long the vacuum is maintained in the tank. If the vacuum is maintained longer than a predetermined time period, then the system determines that the leak test is passed. If the vacuum decays faster than the predetermined time period, then the NVLD test is performed and system determines that the system passes the leak test if the NVLD test is passed.

12 Claims, 5 Drawing Sheets

ENGINE OFF VACUUM DECAY METHOD FOR INCREASING PASS/FAIL THRESHOLD USING NVLD

CROSS REFERENCE TO RELATED APPLICATIONS

This application claims the benefit of U.S. Provisional Patent Application Ser. No. 60/715,726 entitled "Engine Off Vacuum Decay Method for Increasing Pass/Fail Threshold Using NVLD," filed on Sep. 9, 2005, the contents of which are hereby incorporated by reference herein in their entirety.

FIELD OF THE INVENTION

The present invention relates generally to the field of leak detection, and more particularly, to techniques and systems for detecting a leak in an automotive fuel system using Natural Vacuum Leak Detection (NVLD).

BACKGROUND OF THE INVENTION

Conventional fuel systems for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with those standards.

One technique in use for detecting fuel system leaks is known as "Natural Vacuum Leak Detection" (NVLD). In that method, the fuel system, including the fuel tank and canister, are sealed from the atmosphere immediately after an engine shut-down. Over time, vacuum develops in a fuel tank due to gas law effects, especially due to cooling of the tank. A vacuum switch changes state at a certain vacuum level, and that change in state is detected by a processor. If a sufficient vacuum (a sufficiently low pressure) is reached in the system to trip or maintain the switch in the vacuum state, then the system is deemed pass the leak test.

In the present specification, unless otherwise indicated, the term "pressure" means absolute pressure, and a pressure is said to "decrease" down to absolute zero pressure, or a "perfect vacuum." A pressure is said to be "below" a threshold pressure if the pressure, in absolute terms, has a value less than the threshold pressure. That is true whether the pressures are above or below atmospheric pressure. In contrast, as used herein, the term "vacuum" denotes a pressure below atmospheric pressure; a vacuum is said to "increase" as it approaches absolute zero pressure, and a vacuum is said to "decrease" as it approaches atmospheric pressure.

A disadvantage of a conventional natural or passive vacuum evaporative leak detection system is that the testing pass/fail threshold is too low. That is to say, the leakage required to fail an evaporative leak detection test is relatively small. It is desirable for a test to yield a fail status when leakage is just below the required limit set by the various government regulatory agencies. That would maximize the opportunity to locate, and then repair, a system leak. This is particularly difficult in compact and sub-compact automobiles, which typically have small fuel tanks and tightly packaged underbody components.

The fuel tank leakage detection capability for many evaporative leak monitors is 0.5 mm (0.020") as designated by the Air Resources Board of California. Some evaporative leak monitor applications that utilize the NVLD product have unnecessarily low pass/fail thresholds. For example, a system leak of only 0.25 mm (0.010") is often large enough to trigger a malfunction indicator light (M.I.L.) using standard natural vacuum methods. That test outcome is considered to be type "alpha" error. An alpha error is an error caused by a "good" system failing the test. A measurement of alpha error for a fuel system leak detection (often expressed as a percentage) is:

$$\text{Alpha Error} = \frac{\text{Number of Leaks detected when Leak} < 0.5\text{ mm}}{\text{Number of Tests with } 8^\circ\ C./2\ \text{ hr Condition}}$$

There is therefore presently a need to provide a method and system for decreasing the occurrence of alpha error by providing additional opportunities for the diagnostic to PASS even when medium system leakage exists. To the inventor's knowledge, no such technique is currently available.

SUMMARY OF THE INVENTION

One embodiment of the present invention is a method for determining whether a fuel supply system passes a leak test. The fuel supply system includes a fuel tank, an engine and a vacuum switch indicating whether a pressure level in the fuel tank is above or below a threshold pressure level. The method includes, before a shut-down of the engine, maintaining a pressure in the fuel tank below the threshold pressure level; detecting a shutdown of the engine; after detecting the shutdown, monitoring the vacuum switch; and determining that the system passes the leak test if a minimum predetermined time elapses before the vacuum switch indicates that the pressure in the fuel tank is above the threshold pressure level.

The method may further include the step of determining that the system passes the leak test if: (1) the vacuum switch indicates that the pressure in the fuel tank is above the threshold pressure level before the predetermined time elapses; and (2) after the vacuum switch indicates that the pressure in the fuel tank is above the threshold pressure level, the vacuum switch indicates that the pressure in the fuel tank is below the threshold pressure level.

The step of maintaining a pressure in the fuel tank below the threshold pressure level before a shut-down of the engine may further comprise providing a low-level purge flow. The low-level purge flow may be between about 1-2 standard liters per minute.

The step of determining that the system passes the leak test if a minimum predetermined time elapses before the vacuum switch indicates that the pressure in the fuel tank is above the threshold pressure level, may further include starting a timer upon engine shut-down.

The step of maintaining a pressure in the fuel tank below the threshold pressure level before a shut-down of the engine, may further comprise closing a valve to seal the fuel tank. The step of closing the valve may further include applying a damping coil current to prevent poppet resonance. The damping coil current may be about 30% of duty cycle at 500 Hz. The valve may be a Natural Vacuum Leak Detection (NVLD) valve. The predetermined minimum time may be about 200 seconds.

Another embodiment of the invention is a leak testing apparatus. The apparatus includes an internal combustion engine; a fuel tank connected for providing fuel to the engine; a fuel vapor pressure management processor; a vacuum switch connected to the processor, the vacuum switch indicating whether a pressure level in the fuel tank is above or below a threshold pressure level, a sensor connected to the processor for detecting a shut-down of the engine; and a storage device accessible to the processor. The storage device contains instructions that, when executed by the processor, cause the processor to maintain a pressure in the fuel tank below the threshold pressure level before a shut-down of the engine; after detecting the shut-down, monitor the vacuum switch; and determine that the system passes a leak test if a minimum predetermined time elapses before the vacuum switch indicates that the pressure in the fuel tank is above the threshold pressure level.

The storage device may further contain instructions that cause the processor to determine that the system passes the leak test if (1) the vacuum switch indicates that the pressure in the fuel tank is above the threshold pressure level before the predetermined time elapses; and (2) after the vacuum switch indicates that the pressure in the fuel tank is above the threshold pressure level, the vacuum switch indicates that the pressure in the fuel tank is below the threshold pressure level.

The storage device may further comprise a purge valve connecting a vacuum source to the fuel tank, wherein the processor may further contain instructions that cause the processor operate the purge valve to provide a low-level purge flow before engine shut-down is detected. The low-level purge flow may be between about 1-2 standard liters per minute.

The apparatus may further comprise a timer, wherein the storage device further contains instructions that cause the processor to start the timer upon engine shut-down.

The apparatus may further include a valve for sealing a vent of the fuel tank, wherein the storage device further contains instructions that cause the processor to close the valve to seal the fuel tank before engine shut-down in detected.

The storage device may further contain instructions that cause the processor to apply a damping coil current to prevent poppet resonance when closing the valve. The damping coil current may be about 30% of duty cycle at 500 Hz.

The valve may be a Natural Vacuum Leak Detection (NVLD) valve. The predetermined minimum time may be about 200 seconds.

DESCRIPTION OF THE INVENTION

Figure 1:
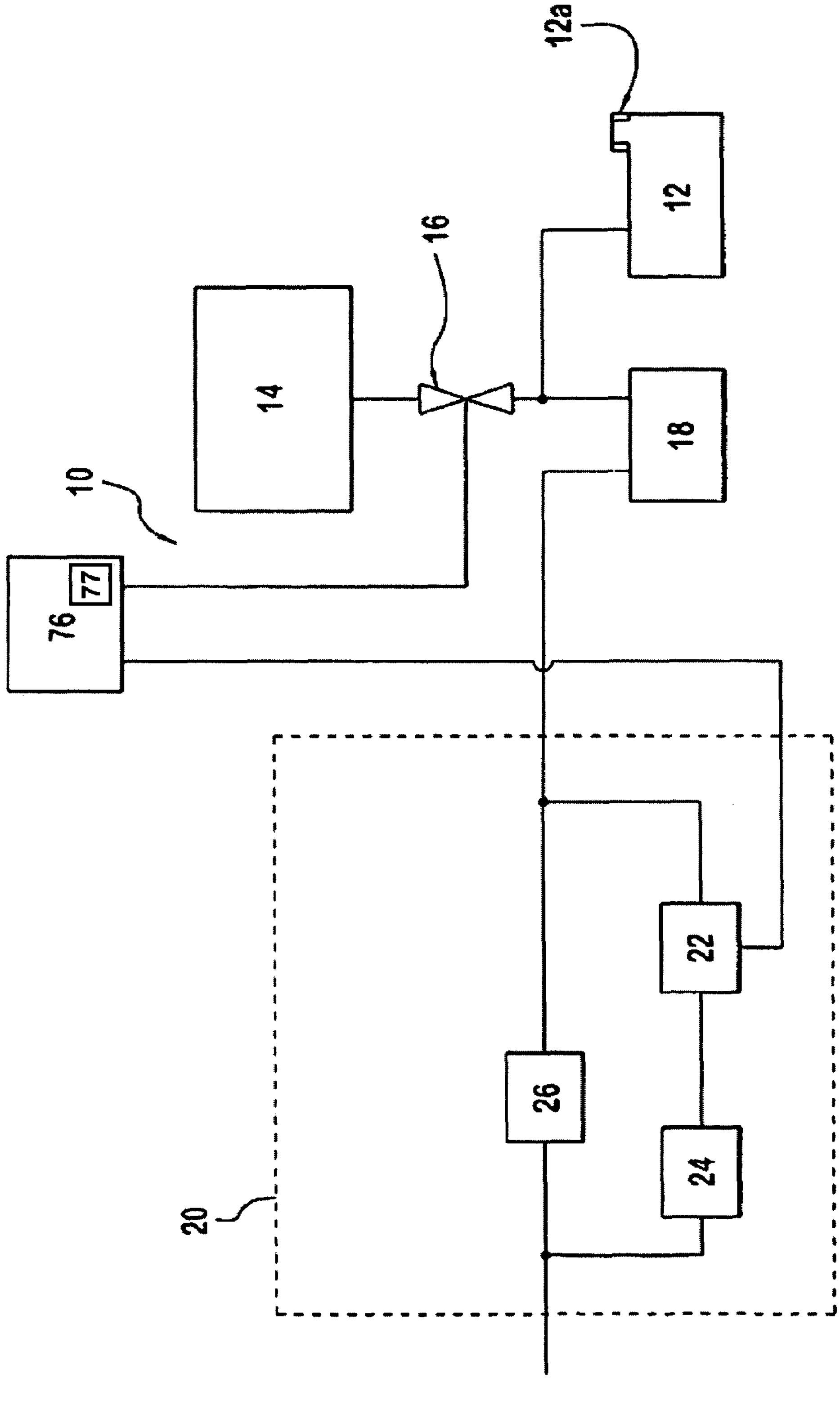
FIG. 1 is a schematic illustration of a fuel vapor system in accordance with the invention.

Referring to FIG. 1, a fuel system 10 for an engine (not shown), includes a fuel tank 12, a vacuum source 14 such as an intake manifold of the engine, a purge valve 16, a charcoal canister 18, an electronic control unit or processor 76 with memory storage 77, and a fuel vapor pressure management apparatus 20.

The fuel vapor pressure management apparatus 20 performs a plurality of functions including signaling 22 that a first predetermined pressure (vacuum) level exists. The signaling 22 includes a vacuum switch that may be activated by movement of a diaphragm in response to a pressure differential across the diaphragm.

The fuel vapor pressure management apparatus 20 also performs "vacuum relief" or relieving negative pressure 24 at a value below the first predetermined pressure level, and "pressure blow-off" or relieving positive pressure 26 above a second pressure level.

Other functions are also possible. For example, the fuel vapor pressure management apparatus 20 can be used as a vacuum regulator, and in connection with the operation of the purge valve 16 and a logic process performed by the processor 76, can perform large leak detection on the fuel system 10. Such large leak detection could be used to evaluate situations such as when a refueling cap 12*a* is not replaced on the fuel tank 12.

It is understood that volatile liquid fuels, including gasoline, can evaporate under certain conditions, such as rising ambient temperature, thereby generating fuel vapor. In the course of cooling that is experienced by the fuel system 10 after the engine is turned off, a vacuum is naturally created by cooling the fuel vapor and air, such as in the headspace of the fuel tank 12 and in the charcoal canister 18. In accordance with the NVLD test described above, the existence of a vacuum at the first predetermined pressure level indicates that the integrity of the fuel system 10 is satisfactory. Thus, signaling 22 is used to indicate the integrity of the fuel system 10 by determining that there are no appreciable leaks. Subsequently, the vacuum relief 24 at a pressure level below the first predetermined pressure level can protect the fuel tank 12 by preventing structural distortion as a result of stress caused by vacuum in the fuel system 10.

The pressure blow-off 26 allows air within the fuel system 10 to be released while fuel vapor is retained. For example, in the course of refueling the fuel tank 12 through filler cap 12*a*, the pressure blow-off 26 allows air to exit the fuel tank 12 at a high rate of flow.

Figure 2:
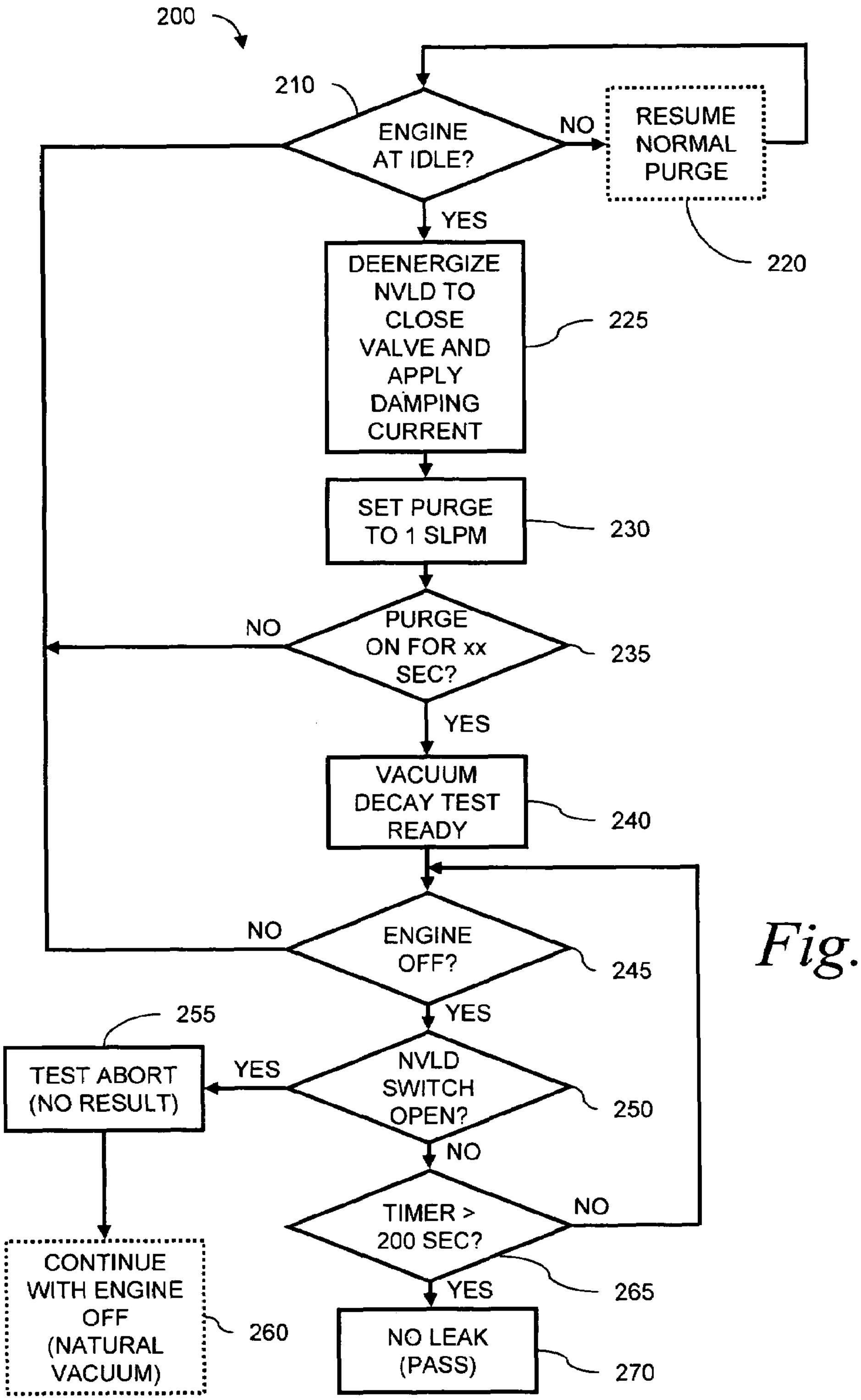
FIG. 2 is a flow chart illustrating a method for detecting leaks in a fuel system according to one embodiment of the invention.

A method 200 in accordance with one embodiment of the invention is represented schematically by the flow chart of FIG. 2. The engine-off vacuum decay test of the present invention utilizes the ability of the NVLD to act as a vacuum regulator. With that in mind, a relatively predictable vacuum characteristic can be achieved in the fuel tank immediately before the engine is shut down. From that state, the NVLD switch is used immediately after engine shutdown to measure how long the tank is able to hold vacuum once the engine is turned off.

In order to pre-condition the fuel tank for the vacuum decay test of the invention, the NVLD must be closed at idle and a minimum, constant, purge flow provided. Thus, referring to FIG. 2, if the engine is at idle (decision 210), the NVLD valve is closed by de-energizing the valve and the appropriate coil current is re-applied to prevent poppet resonance (step 225).

In one embodiment, a fixed damping current of about 30% of duty cycle is applied at about 500 Hz. Alternatively, a variable damping current may be used if required. If the engine is not at idle, normal purge is resumed (step 220).

When the NVLD valve is closed, purge flow is set to a constant, low level (step 230). Experiments have shown that very little flow is required to keep the tank in vacuum with the NVLD de-energized. Typical purge rates of 1-2 standard liters per minute (slpm) are adequate; 1 slpm is preferred. In a preferred embodiment, the test is aborted if purge flow is too high.

In one embodiment of the invention, a fixed duty cycle purge is used, and purge at idle must exceed a minimum time before engine shutdown, or the test is aborted. In a more preferred embodiment, a fixed mass flow purge at idle is used, compensating for MAP, voltage, etc. Purging at idle is required to exceed either a minimum volume or a minimum time before engine shutdown. That purge time requirement may be adjusted to compensate for current tank volume. In a most preferred embodiment, an algorithm controls purge mass flow and NVLD damping current to attempt to maintain a fixed tank vacuum at idle. For example, the target fixed vacuum may be 7.5-8.0 mbar.

In the embodiment shown in FIG. 2, a minimum time must be allowed (decision 235) for the fuel tank to stabilize before the system is ready (step 240) to perform a decay test upon engine shutdown. The engine is monitored for the idle condition during that minimum time.

After the minimum time has elapsed and the system is ready for the vacuum decay test, the engine is monitored for shutdown (decision 245), while continuing to assure that the engine remains in an idle condition (decision 210). Once engine shutdown has been detected, a timer is started. In a preferred embodiment, a 50 millisecond full-field coil pulse is applied to the NVLD coil. The pulse "pushes" the poppet into the seal to reduce or eliminate seal leaks.

From the point of engine shutdown, the switch is monitored by the system. In one embodiment, the NVLD switch input is sampled every ten seconds. In a more preferred embodiment, the switch status is input every second, or every 100 milliseconds. The system is monitored for one of three conditions.

First, the switch may remain closed ("no" in decision 250) for the duration of a minimum predetermined time period, also referred to herein as "vacuum decay threshold period" (decision 265). In one embodiment of the invention based on the testing of a specific test vehicle, that time period is 200 seconds. If the NVLD switch remains closed for the vacuum decay threshold period, that indicates a "no leak" condition, and that the fuel system has passed the vacuum decay test (step 270). That is considered the supplementary "PASS" condition; i.e., the engine off vacuum decay method is considered a supplementary method for achieving "PASS" results, and not the primary leak monitor. In a preferred embodiment, the NVLD is considered the primary leak detection method. Use of the two techniques together is discussed below with reference to FIGS. 3 & 5.

Second, the engine may be restarted (decision 245) before the vacuum decay threshold period elapses. That is considered to be NO RESULT test. If the engine is restarted, the method returns to monitoring the engine for an idle condition (decision 210)

Third, the switch may trip (decision 250) before the vacuum decay threshold period elapses (decision 265). That condition is also considered to be a NO RESULT test (step 255), but the method continues to monitor for a NVLD "PASS" condition (step 260), in which the switch closes due to gas law conditions in the tank. In one embodiment, the NVLD switch input is sampled every 60 seconds after the vacuum decay threshold period elapses to monitor for natural vacuum. The system also monitors for an environmental condition such as a change in temperature at the rate of 8° C. in 2 hours in order to validate the testing conditions.

Figure 3:
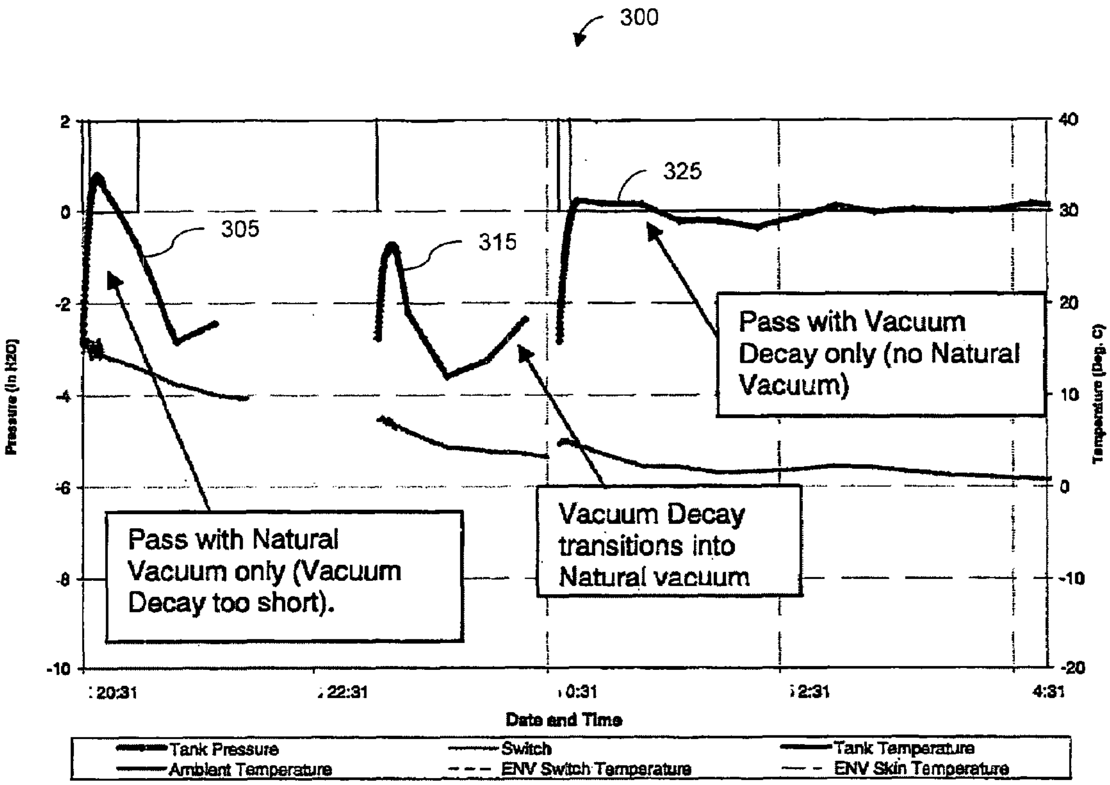
FIG. 3 is a plot of pressure and temperature versus time showing test results of the method of the invention, for an experimental sample.

The graph 300 of FIG. 3 shows tank pressure and system temperatures over time in three experiments run using the engine off vacuum decay test described herein in combination with the NVLD test. Each experiment was performed on a system having a 0.25 mm (0.010 inches) leak, a 60 liter tank holding 20 liters of fuel, and 3 slpm of background purge flow.

In a first experiment yielding pressure trace 305, the system passed the NVLD test, but did not pass the vacuum decay test described above. Starting at a vacuum of 3 inches $H_2O$, the tank pressure quickly rose to 1 inch $H_2O$ positive pressure. The NVLD switch was tripped during that pressure rise before the vacuum decay threshold period elapsed. That condition is considered to be a NO RESULT test (step 255 of FIG. 2), but the method continues to monitor for a NVLD "PASS" condition (step 260). Returning to the trace 305 of FIG. 3, the pressure in the tank thereafter dropped back to 3 inches $H_2O$ vacuum, again changing the NVLD switch position during that pressure drop. That switch transition yielded a "PASS" result in the NVLD test. The pressure trace 305 illustrates that a system may "PASS" despite a too-rapid vacuum decay in the initial engine-off vacuum decay test.

Pressure trace 315 shows an experiment wherein natural vacuum began forming before the NVLD switch was opened; i.e., the tank pressure never rose sufficiently from the initial 3 inches $H_2O$ vacuum to trip the switch. That sequence yields a "PASS" condition in the vacuum decay test because NVLD switch did not open within the vacuum decay threshold period (decisions 250, 265 of FIG. 2).

Pressure trace 325 illustrates a condition wherein the initial vacuum decay is sufficiently gradual to "PASS" the engine-off vacuum decay test of the invention, but insufficient natural vacuum is thereafter formed to trip the NVLD switch. Without the engine-off vacuum decay test of the present invention, that situation would have resulted in an "alpha" error, failing a system that should have passed.

Figure 4:
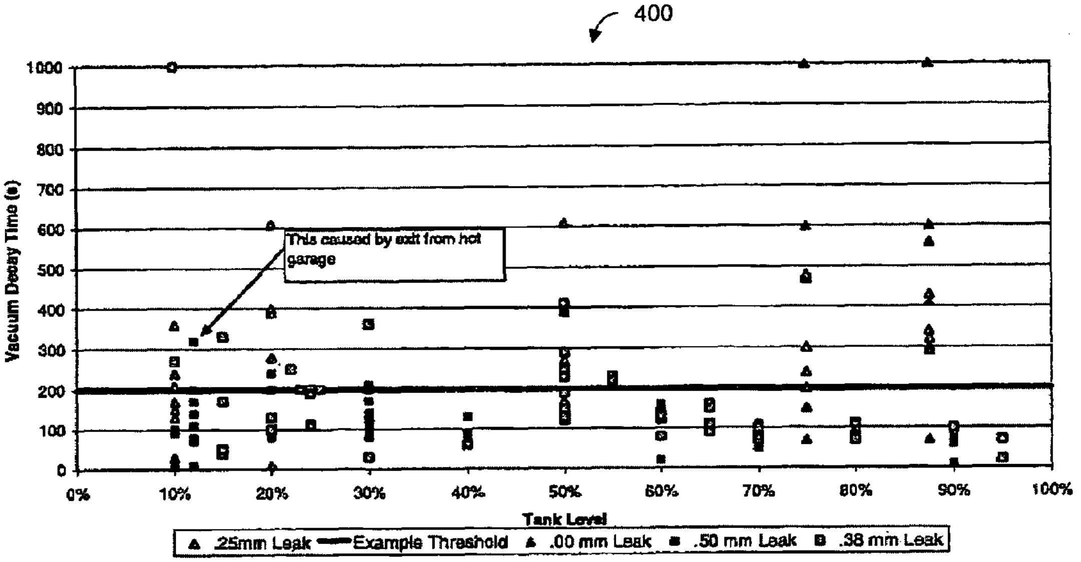
FIG. 4 is a plot of vacuum decay time versus tank level showing an effect of tank level on the method of the invention, for an experimental sample.
Figure 5:
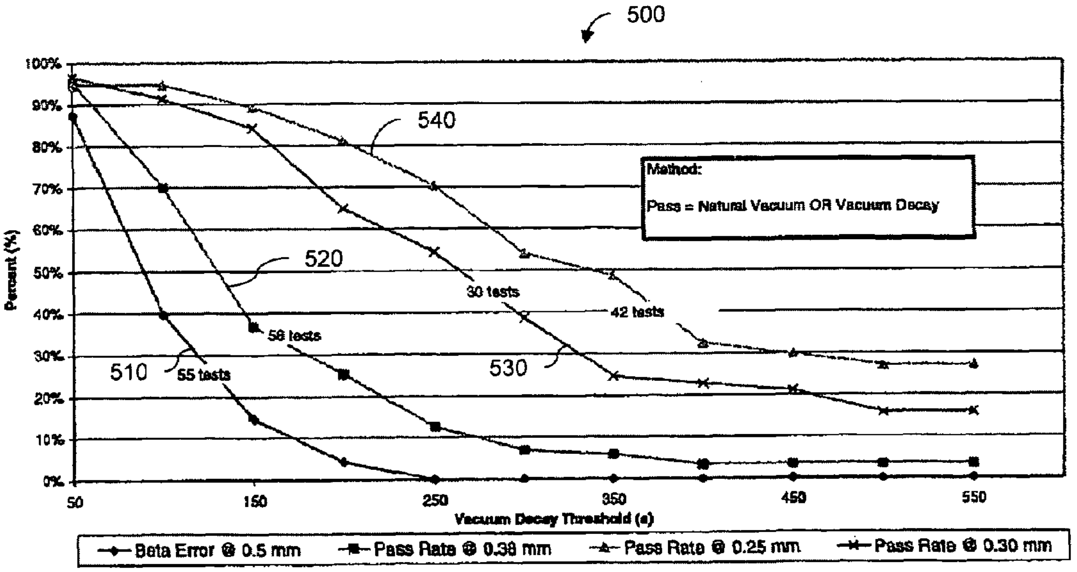
FIG. 5 is a plot showing percent beta error as a function of vacuum decay threshold, for an experimental sample.

Results of experimental runs of the engine-off vacuum decay test of the present invention are shown in FIGS. 4 & 5. FIG. 4 is a scatter plot 400 showing vacuum decay times in seconds as a function of fuel tank level (percent full). The values are shown for leak sizes from 0.0 to 0.50 mm, as indicated in the legend. A 3 slpm background purge was used.

The time threshold has been held constant over all tank levels. The 200-second vacuum decay threshold period used in the experimental runs is shown as a bold horizontal line.

During the test period, it was noted that the decay time was somewhat inversely proportional to the tank volume. That was not expected, but is likely due to the strong 'gas law' phenomena in effect during the first few minutes after engine shutdown. For example, when the tank is nearly empty, one would expect the decay times to be much longer due to the larger vapor space. Decay time, however, remains relatively short. That behavior is most likely due to the strong transient positive temperature effects in the tank immediately after engine shutdown.

FIG. 5 shows a summary 500 of the effect of combining the engine off vacuum decay method of the present invention with the NVLD results. The plot shows error and pass rates as functions of the vacuum decay threshold. The trace 510 show beta error rates introduced at various vacuum decay threshold periods for a 0.50 mm leak, beta error being the passing of a leak that should have been detected. Note that if the vacuum decay threshold is set too low, a high degree of beta error is introduced. The vacuum decay threshold for the experimental runs represented by traces 520, 530, 540 (using leaks of 0.38 mm, 0.30 mm, and 0.25 mm, respectively) was set at 200 seconds to improve the PASS results with leak sizes less than 0.5 mm without incurring significant beta error at leak sizes of 0.5 mm and above.

Figure 6:
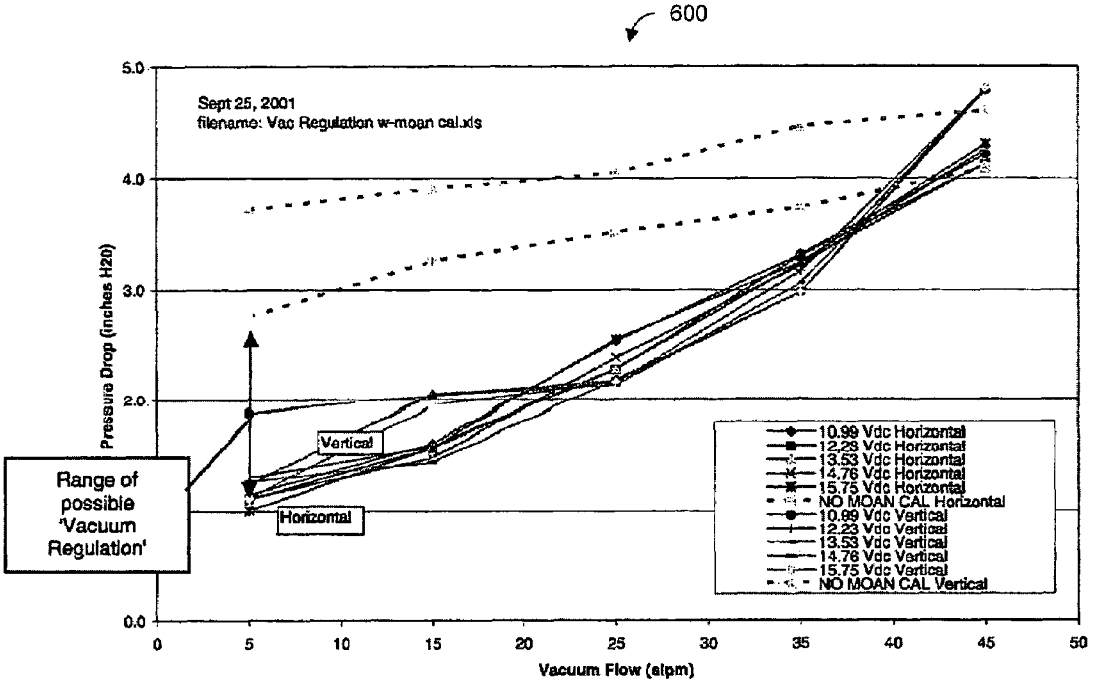
FIG. 6 is a plot of the effect of damping current on the tank pressure.

As noted above, a low level current is applied to NVLD coil during idle purge in order to avoid poppet resonance caused by flow being pulled through the valve. That current provides a damping force to the valve poppet, but also reduces the effective force of the poppet return spring. In effect, the NVLD coil current can be used to modify the set-point of the NVLD vacuum regulating function. That function may be used to compensate for out-of-range purge flow during the pre-conditioning phase. FIG. 6 shows a plot 600 of pressure drop across the valve as a function of vacuum flow, for various voltage points.

To utilize the vacuum decay leak detection method of the present invention, the purge system must be able to operate with the NVLD valve de-energized at idle. The system should be capable of applying a damping current of approximately 30% duty cycle at 500 Hz) to the NVLD coil during idle to prevent poppet resonance. The damping current is not required if the filter hose is less than 20 cm long.

Several variable parameters of the system and method of the invention must be properly adjusted to avoid increasing beta error; i.e., passing fuel systems having a leak greater than 0.5 mm. Beta error may be about 3%-4% in preferred embodiments of the invention. In a most preferred embodiment, beta error is between 2% and 3%.

There is a risk of increasing beta error if the tank vacuum is too high at engine shutdown, or if the decay time threshold is set too low. Active, flexible control of those variables decreases beta error. Further, beta error may increase if a temperature drop is abnormally high directly after engine shutdown. It is preferred to abort the test if such conditions are found to exist.

As noted, an alpha error is the detection of a leak <0.5 mm where none exists. In preferred embodiments of the invention, alpha error of about 10%-15% is normal. In a most preferred embodiment, alpha error is between 5% and 10%.

Since the vacuum decay method is being used only to find additional PASS conditions, the method will not cause additional alpha error. Instead, the method and system of the invention reduce alpha error. If the vacuum decay threshold period is too high, the opportunity to lower the alpha error is reduced or lost. Further, if tank vacuum is too low directly after engine shutdown, the opportunity to lower the alpha error is similarly lost.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the method is disclosed herein with respect to use in combination with a natural vacuum leak detection technique, the system and method of the invention may be combined with other leak detection techniques in order to reduce alpha error. It is to be understood that the embodiments shown and described herein are only illustrative of the principles of the present invention and that various modifications may be implemented by those skilled in the art without departing from the scope and spirit of the invention.

What is claimed is:

1. A method for determining whether a fuel supply system passes a leak test, the fuel supply system including a fuel tank, an engine and a vacuum switch indicating whether a pressure level in the fuel tank is above or below a threshold pressure level, the method comprising the steps of:

before a shut-down of the engine, maintaining a pressure in the fuel tank below the threshold pressure level;

detecting a shut-down of the engine;

closing a valve to seal the fuel tank;

applying a damping coil current to prevent poppet resonance;

after detecting the shut-down, monitoring the vacuum switch; and determining that the system passes the leak test if a minimum predetermined time elapses before the vacuum switch indicates that the pressure in the fuel tank is above the threshold pressure level.

2. The method of claim 1, further comprising the step of:

determining that the system passes the leak test if:

(1) the vacuum switch indicates that the pressure in the fuel tank is above the threshold pressure level before the predetermined time elapses; and (2) after the vacuum switch indicates that the pressure in the fuel tank is above the threshold pressure level, the vacuum switch indicates that the pressure in the fuel tank is below the threshold pressure level.

3. The method of claim 1, wherein the step of maintaining a pressure in the fuel tank below the threshold pressure level before a shut-down of the engine, further comprises:

providing a low-level purge flow.

4. The method of claim 1, wherein the step of determining that the system passes the leak test if a minimum predetermined time elapses before the vacuum switch indicates that the pressure in the fuel tank is above the threshold pressure level, further comprises:

starting timer upon engine shut-down.

5. The method of claim 1, wherein the damping coil current is about 30% of duty cycle at 500 Hz.

6. The method of claim 1, wherein the valve is a Natural Vacuum Leak Detection (NVLD) valve.

7. A method for determining whether a fuel supply system passes a leak test, the fuel supply system including a fuel tank, an engine and a vacuum switch indicating whether a pressure level in the fuel tank is above or below a threshold pressure level, the method comprising the steps of:

before a shut-down of the engine, maintaining a pressure in the fuel tank below the threshold pressure level;

detecting a shut-down of the engine;

after detecting the shut-down, monitoring the vacuum switch;

providing a low-level purge flow of between about 1-2 standard liters per minute; and determining that the system passes the leak test if a minimum predetermined time elapses before the vacuum switch indicates that the pressure in the fuel tank is above the threshold pressure level.

8. A method for determining whether a fuel supply system passes a leak test, the fuel supply system including a fuel tank, an engine and a vacuum switch indicating whether a pressure level in the fuel tank is above or below a threshold pressure level, the method comprising the steps of:

before a shut-down of the engine, maintaining a pressure in the fuel tank below the threshold pressure level;

detecting a shut-down of the engine;

closing a valve to seal the fuel tank;

applying a damping coil current to prevent poppet resonance;

after detecting the shut-down, monitoring the vacuum switch; and determining that the system passes the leak test if a minimum predetermined time elapses before the vacuum switch indicates that the pressure in the fuel tank is above the threshold pressure level, wherein the predetermined minimum time is about 200 seconds.

9. A method for determining whether a fuel supply system passes a leak test, the fuel supply system including a fuel tank, an engine and a vacuum switch indicating whether a pressure level in the fuel tank is above or below a threshold pressure level, the method comprising the steps of:

maintaining a pressure in the fuel tank below the threshold pressure level before engine shut-down;

detecting shut-down of the engine;

de-energizing a valve to close the valve and seal the fuel supply system, applying a damping current to the valve to prevent valve resonance;

after detecting the shut-down, monitoring the vacuum switch; and determining that the system passes the leak test if a minimum predetermined time elapses before the vacuum switch indicates that the pressure in the fuel tank is above the threshold pressure level.

10. The method as recited in claim 9, wherein the damping current is fixed at a desired duty cycle.

11. The method as recited in claim 9, including the step of varying a duty cycle of the damping current.

12. The method as recited in claim 11, wherein the duty cycle of the damping current is varied to modify a set point of the valve vacuum regulating function.

* * * * *